United States Patent [19]

Holmes et al.

[11] 4,092,520
[45] May 30, 1978

[54] LEAKAGE CURRENT THERMOSTAT

[75] Inventors: Richard D. Holmes; Cheng L. Wang, both of Silver Spring, Md.

[73] Assignee: Baxter Travenol Laboratories, Inc., Deerfield, Ill.

[21] Appl. No.: 751,241

[22] Filed: Dec. 16, 1976

[51] Int. Cl.² ............................................. H05B 1/02
[52] U.S. Cl. ................................................... 219/504
[58] Field of Search .............. 219/501, 504, 505, 522, 219/548

[56] References Cited

U.S. PATENT DOCUMENTS

| | | | |
|---|---|---|---|
| 3,462,585 | 8/1969 | Somers | 219/501 |
| 3,716,693 | 2/1973 | Bleckmann | 219/501 |
| 3,885,129 | 5/1975 | Fabricius | 219/504 |

*Primary Examiner*—J. V. Truhe
*Assistant Examiner*—Fred E. Bell

*Attorney, Agent, or Firm*—Henry W. Collins; Paul C. Flattery; Richard G. Kinney

[57] ABSTRACT

The leakage current thermostat is utilized in an electric heater assembly including a housing, a heating element mounted in the housing, electrical supply lines to the heating element and an electrically insulating material in contact with at least a portion of the heating element. The material has a temperature-resistance relationship such that the leakage current therethrough is a steep function of temperature. A leakage current thermostat includes a thermostat control circuit which is coupled to the supply lines and which is operative to control the current to the heating element in response to changes in the leakage current. The heating element is preferably formed by printed circuit techniques on a ceramic material which is affixed in a layer to a metal (conductive) base layer and the leakage current from the printed circuit element to the base is measured by the control circuit.

8 Claims, 4 Drawing Figures

LEAKAGE CURRENT THERMOSTAT

BACKGROUND OF THE INVENTION

1. Field Of The Invention

The field of the invention is electric heater assemblies, and more specifically, a thermostat control circuit for an electric heater assembly.

2. Description Of The Prior Art

Heretofore it has been proposed to control the current to a heating element load in response to the temperature of the heating element. An example of such a temperature control system is disclosed in U.S. Pat. No. 3,339,942.

Also various circuits for interrupting current to an electric heating unit when a preselected maximum temperature has been reached or when some malfunction in the heating unit occurs, have been proposed. In this respect reference is made to the various circuits disclosed in U.S. Pat. Nos.: 3,760,157, 3,794,809, 3,832,527, 3,848,111.

Furthermore it has been proposed to operate circuit breakers in response to an increase in leakage current from a load. Such circuits operate on the basis of an imbalance in the current to the load and the current from the load in the supply lines to the load. Examples of such leakage current operated circuit interrupters are disclosed in U.S. Pat. Nos.: 3,654,515, 3,789,268, 3,813,579, 3,800,121.

The load in U.S. Pat. No. 3,800,121, referred to above is a three-phase electric heating apparatus, and this patent discloses a circuit for controlling current to the heating apparatus in response to leakage current from the three-phase load.

Still further, it has also been proposed to utilize the change in resistance due to the change in temperature in a semi-conducting material, such as ceramic material, to measure the temperature of the ceramic material or an element juxtaposed thereto. In this respect, U.S. Pat. No. 3,679,473 suggests that the variable resistance of a ceramic material can be used to determine the temperature of a body, either separately or in joint function with its use as a heating element.

Other prior art patents which utilize leakage current through, or the change in resistance of, an insulating material or semi-conductive material are disclosed in the following U.S. Pat. Nos.: 2,941,192, 2,745,284, 3,483,750.

As will be described in greater detail hereafter, the present invention differs from the prior art apparatus and circuits referred to above in that the heater assembly of the present invention and the leakage current thermostat utilized therein include a piece of ceramic material in contact with a heating element and control circuitry responsive to changes in the leakage current through the ceramic material to control the current to the heating element and thereby the temperature of the heating element.

SUMMARY OF THE INVENTION

According to the invention, there is provided an electric heater assembly including a resistance heating element, electrical supply lines to said heating element, an electrically insulating material, such as ceramic material, which is in contact with at least a portion of said heating element in such a manner as to track the temperature of the heating element and which has a temperature-resistance relationship such that leakage current therethrough is a steep function of temperature, and thermostat control means coupled to said supply lines for controlling the current to said heating element in response to a change in the leakage current through said electrically insulating material.

DESCRIPTION OF THE PREFERRED EMBODIMENTS

Figure 1:
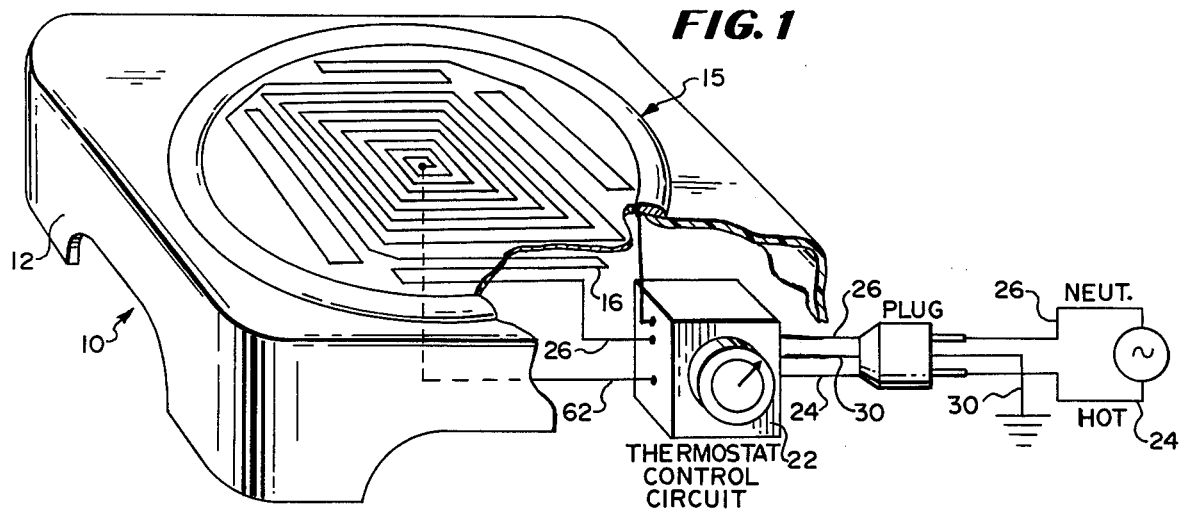
FIG. 1 is a perspective view, partly broken away, of an electric heater assembly utilizing the leakage current thermostat of the present invention with portions of the electrical circuit thereof shown schematically.

Referring now to the drawings in greater detail, an electric heater assembly is shown in FIG. 1 and is generally identified by reference numeral 10.

The particular illustrated heater assembly 10 is of the "hot plate" variety and includes a housing 12 preferably an insulating material such as high temperature plastic therein for supporting a heating unit 15 on the housing 12. The unit 15 includes a resistance heating element 16 which may be formed by a printed circuit technique on an insulating substrate.

Figure 2:
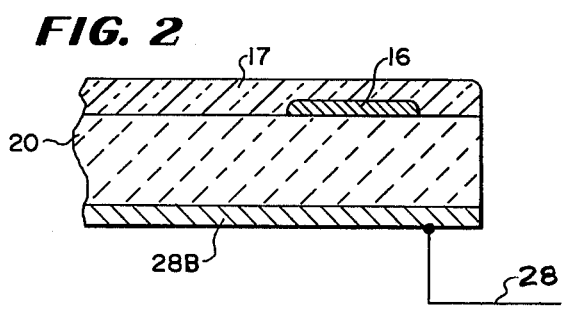
FIG. 2 is a fragmentary enlarged sectional view of a portion of the assembly of FIG. 1.

As best seen in FIG. 2, the heating element 16 may be "printed" on an electrically insulating pyro-ceramic substrate 20 which is formed on a conducting metal base 28B and is covered by a thin layer of electrically insulating material 17.

In accordance with the present invention the heater assembly 10 further includes a thermostat control circuit 22 and supply lines 24 and 26 which are coupled through the control circuit 22 to the heating element 16. Also, a conductor 28 is connected to the base 28A and to ground 30 from the electrical system from which the heater assembly 10 is energized.

The substrate 20 serves as a sensor as it has a resistance-temperature relationship such that the leakage current through the ceramic sensor 20 is a steep function of temperature. As a result changes in leakage current through the sensor 20 are directly related to changes in the temperature of the heating element 16. As will be described in greater detail in connection with the description of FIGS. 3 and 4, the thermostat control circuit 22 is responsive to a change in, or changes in, the leakage current flowing through conductor 28 for controlling the current flowing through the supply lines 24 and 26 to the heating element 16.

Although the ceramic sensor 20 is shown, as is preferred, as the electrical insulating substrate of a printed circuit heater it is to be understood that the sensor can take other forms. For example, it could be a separate element added to an air insulated heater element, such as may be used in a toaster or radiant heater.

Although illustrated in a hot plate type of heating apparatus the present invention is of more general application and, in at least its broader aspects, may find utility in any heating elements employing an electrically insulating material, that tracks or follows the temperature of the heating element and exhibits a marked change in its own electrical conductivity with temperature.

Figure 3:
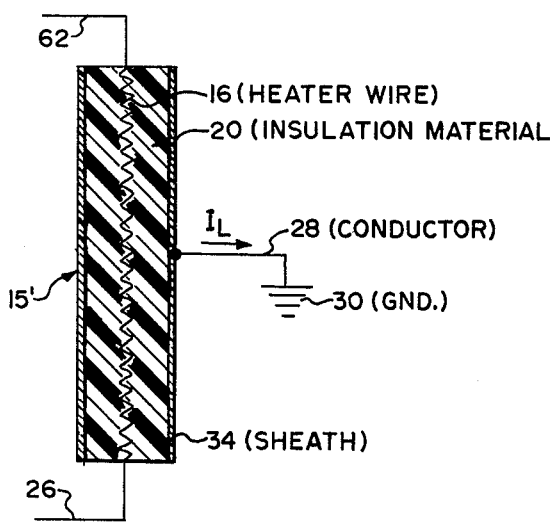
FIG. 3 is a view, partly in section and partly in schematic circuit diagram, of an alternative construction of another heater assembly with which the present invention may be used.

Another embodiment for a heating element designated 15, is shown in FIG. 3. In this case the heater element 15 is of the tubular sheathed type wherein a central heater wire 16 is held physically rigid by compacted insulating material such as magnesium oxide in a conductive sheath 34. In this case, the electrical insulation material 20 which serves as the sensing material, also may be ceramic, or any other insulating material exhibiting the desired temperature-resistance characteristic. The electric heater wire 16 is enclosed by the insulation 20. The metal sheath could be any form and either be connected directly to GND 30 through the conductor 28 or connected to the signal input terminal 15 of control circuit 22.

Figure 4:
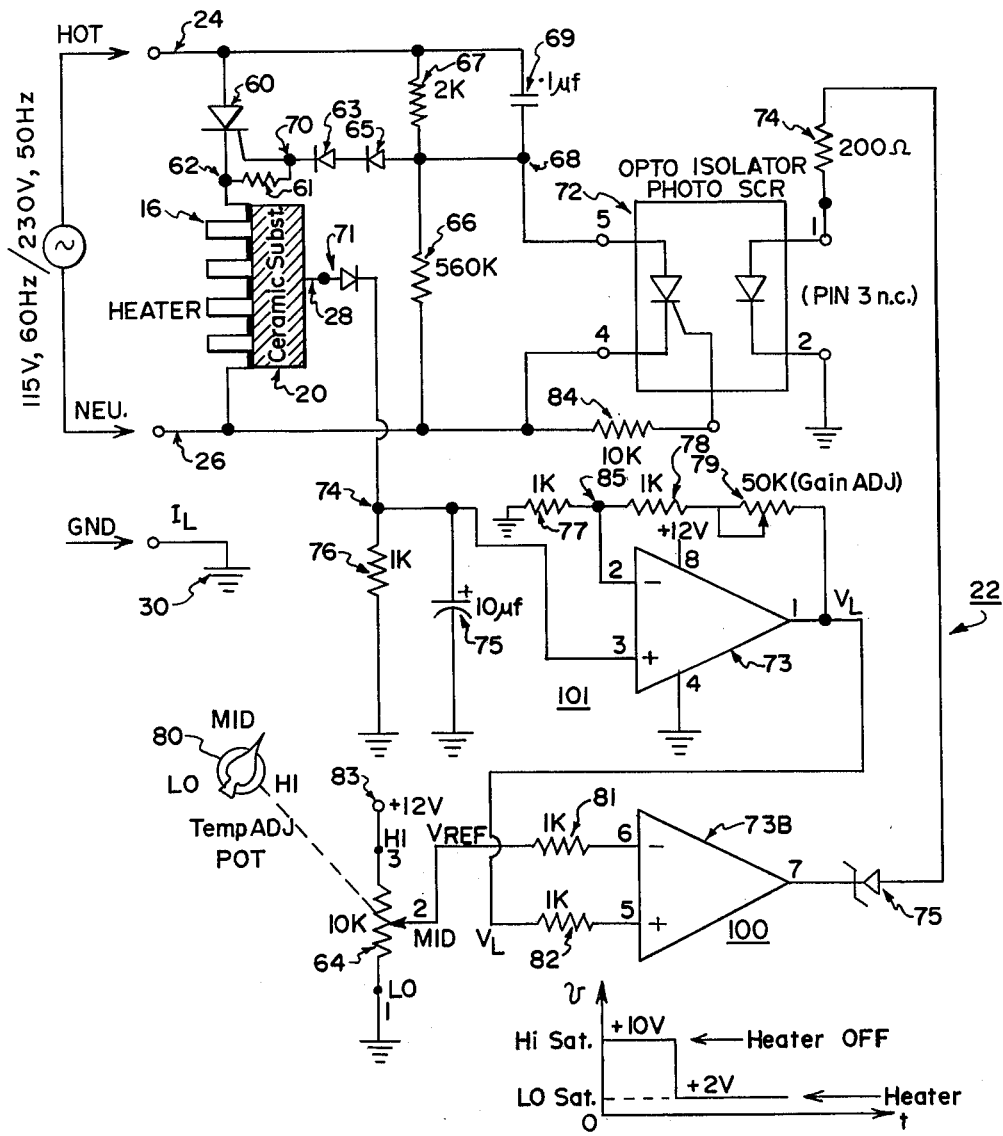
FIG. 4 is a circuit diagram of the heater assembly and leakage current thermostat of FIGS. 1 and 2.

Referring to FIG. 4, there is depicted in detail the circuit 22 of FIG. 1 and its interconnection to the heating element 16, substrate 20 and source of electric power 24, 26. This circuit 22 includes an AC power switching section 100 and a signal processing section 101. The section 100 serves to cycle on and off the electric power from lines 24, 26 to the heater 16 in response to the output of the signal processing section 101. This section 101 serves to pick up and process a leakage current signal from the heater 16 through the substrate 20 to line 28 and drives the switching section 100 in response to it and to the setting of the temperature adjusting control 80.

In more detail, the power switching section 100 includes a switching device 60, e.g., a power SCR which is connected in series with the heating element 16 and is put across the input lines 24 (Hot) and 26 (Neu). Two diodes, 63 and 65 in series, are connected between the gate 70 of the SCR 60 and a point 68 to which is connected one end of a resistor 67 and one end of a resistor 66. The other end of resistor 67 is connected to the line 24 and the other end of resistor 66 is connected to the line 26. A resistor 61 is connected between the gate 70 and the cathode 62 of the SCR 60. A capacitor 69 is connected across the line 24 and the point 68. The point 68 is also connected to an opto-isolator 72. This particular isolator 72 includes a light responsive SCR whose main or power circuit is connected to point 68 to line 26. A resistor 84 is connected between the control or gate of the SCR of element 72 and the line 26.

The signal processing circuit or section 101 includes a diode 71 which is connected to the ceramic substrate through conductor 28. The cathode of diode 71 is connected to a point 74 and then through the parallel connection of a resistor 76 and a capacitor 75 to ground. The point 74 is also connected to the positive input of a first operational amplifier (OP AMP) 73. The negative input of the OP AMP 73 is connected through a resistor 77 to ground and also through a fixed resistor 78 and a variable resistor 79 to the output of OP AMP 73. The variable resistor 79 serves as a gain adjustment. The output from OP AMP 73 is connected through a resistor 82 to the positive input of another operative amplifier (OP AMP) 73B. The negative input of OP AMP 73B is connected through a resistor 81 to the wiper of potentiometer 64. Potentiometer 64 is connected between a source of positive potential 83 (e.g., plus 12VDC) and ground.

The output from OP AMP 73B is coupled through the cathode of Zener diode 75 to one end of resistor 74. The other end of resistor 74 is connected to the light emitting diode of the opto-isolator 72, whose other side is grounded. The pin 4 of 73 is connected to ground 30 and pin 8 is connected to the plus 12V point 83. The potentiometer 64 is controlled by knob 80, the position of which is related to the operating temperature of the heating element 16. It should be noted that the signal processing section 100 is separated from the power switching section to provide high isolation between the AC common 26 and the DC common, i.e., the earth ground 30.

In operation this circuit serves to control and maintain the temperature of the heating element 16, a portion of which is contacted or enclosed by a piece of ceramic substrate 20. The leakage current through 20 increases when the temperature of 16 increases and vice versa. Hence, the temperature can be sensed and controlled through a proper measuring of the leakage current through 20. The temperature range can be determined by adjusting the gain control 79 and the power selection of the heater 16. The desired operating temperature of 16 can be obtained by adjusting the variable resistor 64. The power requirement of 16 can be as high as desired as long as the SCR 60 can handle it. In one working prototype the type selected for SCR 60 has 2N688, which was found to be adequate for handling a one-kilowatt heater.

The circuit functions as follows: Set the temperature adjustment potentiometer 64 by turning knob 80 to get a desired operating temperature, i.e., a desired voltage at the wiper of 64 designated as $V_{REF}$. Adjust the gain adjustment pot 79 so that the heater 16 is on. The leakage voltage signal, designated as $V_L$, is now lower than $V_{REF}$, i.e., $V_L$ is less than $V_{REF}$. Hence the output of 73 is at the low saturation state (about +2V) and Zener diode 75 is not conducting. There is no current flowing through the light emitting diode 72. The SCR of 72 is shown not conducting. The power SCR 60 is now ON for every positive half cycle of the AC input. Hence, the heater 16 is ON for every positive half cycle of the AC input. For every negative half cycle, heater 16 is always OFF. This is a half wave control. Full wave control could be obtained by substituting a Triac for the device 60 and a dual control optical isolator 72 instead of a single, and the heater 16 could be operated for both cycles.

The temperature of the heating element 16, as well as the ceramic substrate 20, is increased while the heater 16 is on. The leakage current flowing through the substrate 20 and returning to the third wire ground 30, is increased substantically due to temperature rise. The diode 71 rectifies the random AC leakage current into a DC voltage signal appearing across the resistor 76. A filter capacitor 75 is used to get a smoother DC potential across resistor 76. The weak voltage signal across 76 is amplified by OP AMP 73 the gain of which is 2 to 52 adjustable. A higher gain could be obtained if a higher resistance value is selected for the variable resistor 79. The amplified signal, designated as $V_L$, is increased due to the increase in the leakage current. When the voltage of $V_L$ (output of OP AMP 73) approaches and exceeds the voltage of $V_{REF}$ (voltage at the wiper), i.e., $V_L$ is greater than or equal to $V_{REF}$, the output of OP AMP 73B switches from the low saturation state (e.g. about +2V) to a HI saturation state (e.g. about +10V). The Zener diode 75 is then conducting and the light emitting diode of device 72 is caused to produce light. The photo SCR is thus turned on. The power SCR 60 is thus turned off because of the shunting of its gate circuit. Hence the heater element 16 is off. The capacitor 69 provides an earlier phase for photo SCR to turn on before SCR 60 turns on. Elements 63, 65 and 67 provide a current path for the gate of SCR 60 so that 60 can turn on while the photo SCR is off. Resistors 61, 66 and 84 are used for stability and for prevention from a false trigger due to noise, transient, etc.

After the heater 16 is off: the temperature is dropped; the leakage current drops; the voltage across 76 drops; the voltage $V_L$ drops; $V_L$ is less than $V_{REF}$ again; the output of OP AMP 73B switches back to low saturation state; Zener diode 75 is off; no current flows through the light emitting diode of device 72, photo SCR of device 72 is off; the voltage shunting to the gate of power SCR 60 is released; SCR 60 is ON, hence the heater 16 is energized again. After several cycles of this control, an equilibrium state is reached at which the pre-set temperature is maintained. Because of the isolation between AC power common 26 and DC circuit common 30 (earth ground), the polarity of the AC line power could be either normal or reversed and would not affect any part of the circuit operation. The power SCR 60 and the opto-isolator 72 may be selected so that either 115 V, 60 Hz or 230 V, 50 Hz power source could be used.

A prototype was constructed in accordance with FIG. 4 and examples of component values are given in that figure.

The following circuit elements were employed:

| | |
|---|---|
| SCR 60 | 2N688 |
| Diodes 63,65 | IN4004 |
| Diode 28 | IN4004 |
| Device 72 | MCS2400 |
| OP AMPs 73,73B | MC1458 (dual package) |
| Diode 75 | IN4734 |

Although care has been taken to set these out accurately, it is possible that errors may have occurred in the transfer or coupling of these values and identifications and the reader is cautioned to employ the well known experimental and not schematic techniques to verify these before use. The working prototype used a silicon and clay substrate known as Alsarog and available from the Duco Ceramic Company of Pittsburg, Pennsylvania. A substrate thickness of approximately between 20 and 60 one-thousands of an inch may be employed with good results.

Also, although one embodiment has been detailed, it is intended for illustration only and it should be clearly understood that the principles of the present invention can be employed in many ways. Indeed the present inventors may decide in the future, to make many modifications and changes in the above described embodiment (which is, however, the presently preferred mode of practicing the invention).

For example, the leakage current may alternatively be sensed by using a thermomagnetic toroid about the lines 22, 24. When there is leakage current from the heater 16 there will be an imbalance in the current flowing through the lines 22, 24 and this will generate a varying magnetic flux at the toroid and thus generate a signal from it. This signal then could be used to control the power switching to the heater.

From the foregoing description, it will be apparent that the leakage current thermostat and heater assembly incorporating same of the present invention have a number of advantages, some of which have been described above, and others of which are inherent in the invention. Also, it will be apparent that obvious modifications and variations, some of which have been described above, can be made to the leakage current thermostat and heater assembly incorporating same without departing from the spirit or scope of the invention.

We claim:

1. An electric heater assembly including a heating element, electrical supply lines to said heating element, electrically insulating material which is in contact with at least a portion of said heating element, and which has a temperature-resistance relationship such that leakage current therethrough is a steep function of temperature, and thermostat control means coupled to said supply lines for controlling the current to said heating element in response to a change in the leakage current through said electrically insulating material, said thermostat control means includes a first electronic switching device having a first gate and being connected in series with said heating element, a voltage dividing circuit with at least two impedances therein connected in series across said supply lines with the junction between said impedances being connected to said first gate, a second electronic switching device having a second gate and being connected between said first gate and one of said supply lines, said material being connected to said second gate, and an impedance coupled between said second gate and the system ground.

2. The electric heater assembly according to claim 1 wherein one of said impedances in said voltage dividing circuit is a variable resistance.

3. The electric heater assembly according to claim 2 wherein said variable impedance is connected to a thermostat control knob, the position of which is related to the temperature of said heating element.

4. The electric heater assembly according to claim 1 including a variable impedance in series with said second electronic switching device.

5. An electric heater assembly comprising a conductive plate, an electrically insulating material formed in a layer on said plate, which material exhibits decreasing electrical resistency as its temperature rises, a heating element formed on said insulating material and separated from said conducting plate thereby, so that a normally acceptable electrical isolation is maintained and only a small leakage current may flow between the heating element and the plate, means for coupling electric power to the heating element and for grounding said plate, and said thermostat means including means for sensing the leakage current from the electric current supplied to said heating element and ground, and means for varying the average power supplied to the heating element in response thereto.

6. The invention of claim 5 wherein the means for varying the average power supplied to the heating element in response to the sensed leakage current is manually adjustable so as to allow different heating power outputs from the heating element to be selected by the user.

7. A heater assembly of the hot plate type which comprises:
a resistance heater element carried by a normally electrically insulating ceramic substrate, said ceramic substrate having a temperature-resistance relationship such that leakage current therethrough is a steep function of temperature;
an electrically conductive member spaced from said resistance heating element;

current supply lines connected to said resistance heating element;
means connected to said electrically conductive member for sensing leakage current through said ceramic substrate; and
thermostat control means coupled to said supply lines and responsive to said sensing means for controlling the current to said resistance heating element in response to a change in the leakage current through said ceramic substrate.

8. The electric heater assembly according to claim 1 wherein said heating element is applied by printed circuit techniques to said ceramic material.

* * * * *